United States Patent

Kamiguchi et al.

[11] Patent Number: 6,167,325
[45] Date of Patent: Dec. 26, 2000

[54] CNC DATA CORRECTION METHOD

[75] Inventors: Masao Kamiguchi, Minamitsuru-gun; Susumu Maekawa, Oshino-mura, both of Japan

[73] Assignee: Fanuc Ltd., Yamanashi, Japan

[21] Appl. No.: 08/952,781

[22] PCT Filed: Mar. 28, 1997

[86] PCT No.: PCT/JP97/01089

§ 371 Date: Nov. 26, 1997

§ 102(e) Date: Nov. 26, 1997

[87] PCT Pub. No.: WO97/37291

PCT Pub. Date: Oct. 9, 1997

[30] Foreign Application Priority Data

Mar. 29, 1996 [JP] Japan .................................. 8-103172

[51] Int. Cl.[7] .................. G06F 19/00; G05B 19/42
[52] U.S. Cl. .................. 700/183; 700/182; 700/179; 700/187; 700/169; 700/176; 700/87; 700/164
[58] Field of Search .................. 318/567, 568.19, 318/568.1, 568.24, 568.11, 590; 82/18, 118; 700/183, 182, 179, 86, 187, 180, 169, 176, 87, 163, 164, 56

[56] References Cited

U.S. PATENT DOCUMENTS

| | | | |
|---|---|---|---|
| 3,917,930 | 11/1975 | Davey et al. | 318/561 |
| 4,506,331 | 3/1985 | Kishi et al. | 700/187 |
| 4,603,391 | 7/1986 | Inoue et al. | 700/162 |
| 4,648,024 | 3/1987 | Kato et al. | 700/187 |
| 4,750,104 | 6/1988 | Kumamoto et al. | 364/167.02 |
| 4,799,143 | 1/1989 | Tanaka et al. | 364/191 |
| 4,866,631 | 9/1989 | Kuragano et al. | 700/187 |
| 5,005,135 | 4/1991 | Morser et al. | 700/193 |
| 5,140,237 | 8/1992 | Sasaki et al. | 318/568.11 |
| 5,153,490 | 10/1992 | Ueta et al. | 318/571 |
| 5,175,407 | 12/1992 | Seki et al. | 219/69.12 |
| 5,237,509 | 8/1993 | Ueta et al. | 700/193 |
| 5,262,954 | 11/1993 | Fujino et al. | 700/112 |
| 5,434,793 | 7/1995 | Körner | 700/189 |
| 5,513,113 | 4/1996 | Okada et al. | 700/179 |
| 5,581,467 | 12/1996 | Yasuda | 700/193 |
| 5,740,081 | 4/1998 | Suzuki | 702/94 |
| 5,877,960 | 3/1999 | Gross et al. | 700/175 |

FOREIGN PATENT DOCUMENTS

| | | |
|---|---|---|
| 0 398 704 A2 | 11/1990 | European Pat. Off. . |
| 0 398 704 A3 | 11/1990 | European Pat. Off. . |
| 58-129606 | 8/1983 | Japan . |
| 62-94248 | 4/1987 | Japan . |
| 63-118606 | 8/1988 | Japan . |
| 3-164811 | 7/1991 | Japan . |
| 4-111003 | 4/1992 | Japan . |
| 8-185211 | 7/1996 | Japan . |

OTHER PUBLICATIONS

EP Search Report for application No. EP 97 91 4563 dated Mar. 2, 2000.

*Primary Examiner*—William Grant
*Assistant Examiner*—Ivan Calcaño
*Attorney, Agent, or Firm*—Staas & Halsey LLP

[57] ABSTRACT

Actual machining positions P1, P2, ... corresponding to command positions S1, S2, S3 ... of each block of NC data are obtained by trial machining. Positions that correspond symmetrically to the actual machining positions P1, P2, ... with respect to the command positions S1, S2, S3 ... of each block are obtained. Modified NC data are created with use of the symmetrical positions as modified command positions for each block. The modified NC data include correction values for modifying positional differences attributable to a delay in a servo system. Therefore, if machining is carried out in accordance with the modified NC data, the correction values and a follow-up delay attributable to the actual delay in the servo system cancel one another, so that a high-accuracy work shape can be obtained.

10 Claims, 9 Drawing Sheets

FIG. 5

| COMMAND DATA s | POSITION DATA P | LOAD DATA t |
|---|---|---|
| s 1 | p 1 | t 1 |
| s 2 | P 2 | t 2 |
| s 3 | P 3 | t 3 |
| .. | .. | .. |
| .. | .. | .. |
| s i | P i | t i |

FIG. 6

| CAD DATA | CORRESPONDING COMMAND DATA | CORRESPONDING POSITION DATA | CORRESPONDING LOAD DATA | DIFFERENCE (S-P) | CORRECTED DATA |
|---|---|---|---|---|---|
| C 1 | S 1 | P 1 | t 1 | d 1 | S´1 |
| C 2 | S 2 | P 2 | t 2 | d 2 | S´2 |
| C 3 | | | | | |
| C 4 | S 3 | P 3 | t 3 | d 3 | S´3 |
| C 5 | S 4 | P 4 | t 4 | d 4 | S´4 |
| C 6 | S 5 | P 5 | t 5 | d 5 | S´5 |
| C 7 | S 6 | P 6 | t 6 | d 6 | S´6 |
| C 8 | | | | | |
| C 9 | S 7 | P 7 | t 7 | d 7 | S´7 |
| C 10 | | | | | |
| C 11 | | | | | |
| C 12 | S 8 | P 8 | t 8 | d 8 | S´8 |
| .. | .. | .. | .. | .. | .. |
| .. | .. | .. | .. | .. | .. |
| .. | .. | .. | .. | .. | .. |
| C j | S i | P i | t i | d i | S´i |
| .. | .. | .. | .. | .. | .. |
| .. | .. | .. | .. | .. | .. |
| .. | .. | .. | .. | .. | .. |

CNC DATA CORRECTION METHOD

BACKGROUND OF THE INVENTION

1. Technical Field

The present invention relates to a correction method for NC data for high-accuracy machining.

2. Background Art

After move commands for servomotors for driving individual axes of a machine tool are given to a servo system in accordance with NC data, the servo system carries out servo processing, whereupon the servomotors for the individual axes are driven to execute machining. However, a delay in the servo system can be a hindrance in executing high-accuracy machining. The delay in the servo system causes an actual tool path to deviate from the paths of machining blocks commanded by the NC data, thereby causing machining errors.

In the ordinary machining, these machining errors resulting from the follow-up delay are within an allowable range and thus are negligible. In carrying out special high-accuracy machining, however, the machining errors resulting from the follow-up delay are not negligible. In order to reduce the machining errors caused by the follow-up delay, therefore, a conventionally adopted method is such that machining is carried out at a machining speed lowered to a degree that the machining errors resulting from the follow-up delay come within the allowable range.

Reduced machining speed, however, naturally results in longer machining time, and searching for an appropriate machining speed by trial and error takes much time. Thus, it is not easy to modify data in NC programs properly in order to execute high-accuracy and high-efficiency machining.

SUMMARY OF THE INVENTION

The object of the present invention is to provide a CNC data modification method for obtaining NC data that enable high-accuracy machining of a workpiece.

In order to achieve the above object, an NC data modification method according to the present invention comprises: (a) a step of carrying out machining by a CNC machine tool in accordance with created NC machining data to obtain actual machining position data corresponding to a command position for the starting or ending point of each block of the NC data from a CNC, and obtaining the difference between an actual machining position and the command position for the starting or ending point of each block; (b) a step of obtaining a data correction value based on the difference; and (c) a step of setting a point obtained by advancing the command position for the starting or ending point in the NC machining data oppositely from the actual machining position by a distance corresponding to the data correction value obtained in the step (b), on a straight line connecting the command position for the starting or ending point of the block and the actual machining position corresponding thereto, as a modified command position for the starting or ending point of the block of the NC machining data.

Preferably, the difference itself serves as the data correction value. Thus, the corrected command position is the position that corresponds symmetrically to the actual machining position for the starting or ending point of one block with respect to the command position therefor.

Preferably, the block by the NC machining data is composed of a series of infinitesimal straight lines constituting a curve created by utilizing a CAD, and the straight line connecting the command position for the starting or ending point in the NC data and the actual machining position corresponding thereto is a line normal to the curve at the starting or ending point.

Preferably, current positions of a move command and the actual machining position are obtained individually for each distribution cycle of the move command while the machining is carried out by means of the CNC machine tool, one of the current positions of the move command obtained individually for the distribution cycles is selected as a command position for the starting or ending point of one block of the NC data, and the actual machining position corresponding to the selected current position of the move command is used as actual machining position data for the starting or ending point of the block.

Further preferably, a load acting on a feed axis or main axis at the starting or ending point of each block of the NC data is further obtained, and a data correction value is determined in accordance with this load and the aforesaid difference.

The present invention being arranged in this manner, the NC data can be modified in consideration of machining errors attributable to a servo delay. If the machining is carried out by using the modified NC data, therefore, an actual delay in a servo system is canceled by the modification, so that the work shape of a machined workpiece conforms to a target shape with high accuracy.

BRIEF DESCRIPTION OF THE DRAWINGS

FIG. 5 is a diagram for illustrating a table for storing command data, actual position data, and load data according to the embodiment of the present invention;

FIG. 6 is a diagram for illustrating a table for obtaining modified NC data according to a first embodiment of the present invention;

BEST MODE FOR CARRYING OUT THE INVENTION

A. Description of First Embodiment

A first embodiment of the present invention is characterized in that NC data is created according to a work shape that is composed of a spline curve created by a CAD system, and that machining is executed in accordance with the created NC data and the NC data is modified based on the machining errors occurred therein. As a result, modified NC data, when applied, produces extremely small machining errors.

(a) Description of Principle of NC Data Modification Method

The following is a description of the principle of an NC data modification method according to the first embodiment of the present invention.

Figure 1:
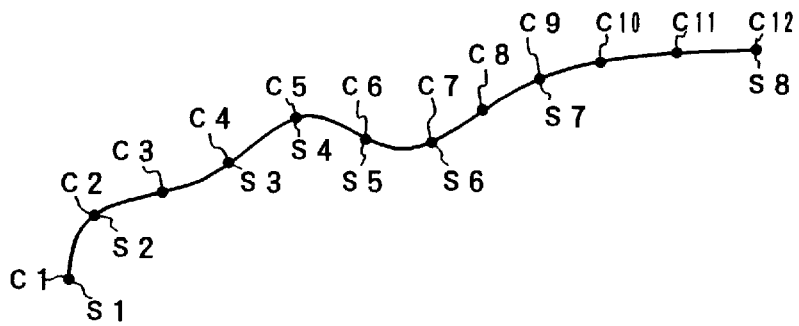
FIG. 1 is a diagram for illustrating the relation between CAD data and NC data.

As shown in FIG. 1, CAD data for creating the NC data is defined as a group of points Cj(Xcj, Ycj, Zcj) (j=1, 2, 3 . . . ) on the spline curve. The NC data is created by defining this spline curve as a series of straight lines (segments connecting points Si and Si+1 in FIG. 2, as described later) with infinitesimal lengths.

Figure 2:
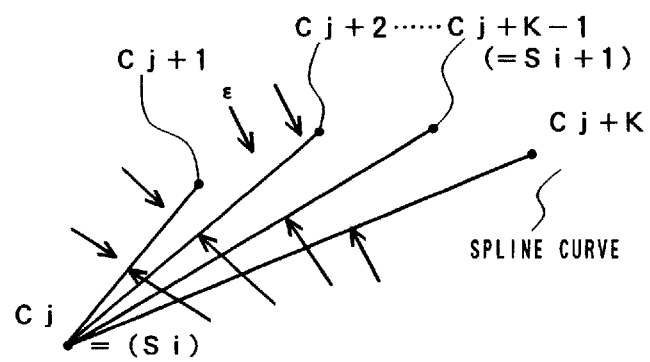
FIG. 2 is a diagram for illustrating a method for generating NC data from the CAD data.

It is determined whether or not a straight line that connects one point Cj and its subsequent point Cj+1 on the spline curve has a deviation $\epsilon$, not smaller than a set point (e.g., 1 $\mu$m), from that portion of the spline curve between the two points. If there is no such deviation $\epsilon$ that is not smaller than the set point, it is further determined whether or not a straight line that connects the point Cj and another subsequent point Cj+2 has a deviation $\epsilon$, not smaller than the set point from that portion of the spline curve between these two points. If there is still no such deviation $\epsilon$ that is not smaller than the set point, it is further determined whether or not a straight line that connects the point Cj and still another subsequent point Cj+3 has a deviation $\epsilon$, not smaller than the set point, from that portion of the spline curve between these two points. When the point Cj and a point Cj+k are finally connected in like manner by means of a straight line, as shown in FIG. 2, and if a deviation $\epsilon$ not smaller than the set point occurred for the first time between this straight line and that portion of the spline curve between these two points, the point Cj and a point Cj+k−1 are regarded as a starting point and an ending point, respectively, of one path (one block) of the NC data.

As described above, starting and ending points Si(Xsi, Ysi, Zsi) (i=1, 2, 3 . . . ) are selected among the points Cj on the spline curve. In the example shown in FIG. 1, C1, C2, C4, C5, C6, C7, C9 and C12 correspond to S1, S2, S3, S4, S5, S6, S7 and S8, respectively.

Figure 3:
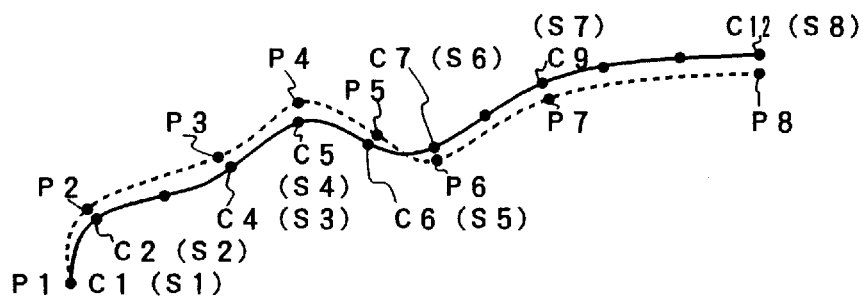
FIG. 3 is a diagram for illustrating the CAD data and actual machining position data.
Figure 4:
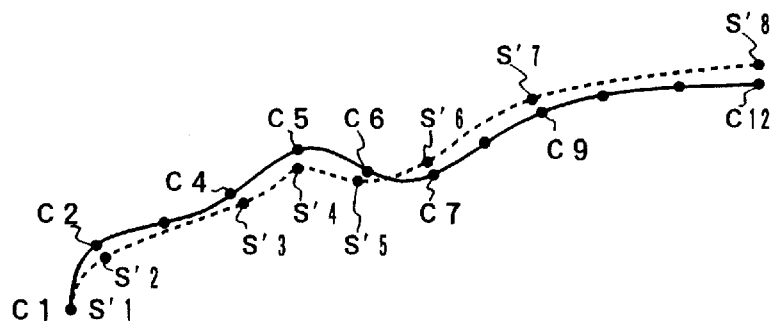
FIG. 4 is a diagram for illustrating modified NC data according to an embodiment of the present invention.

When actual machining with a CNC machine tool is carried out using thus created NC data, an actual tool position Pi corresponding to the starting point (ending point) Si is obtained, and, further, a difference d (=Si−Pi) between the starting point (ending point) Si for the command position, and the actual position Pi is obtained. FIG. 3 shows the actual tool positions Pi corresponding to the starting points (ending points) Si and their corresponding points Cj (=Si) for the CAD data. A normal at the corresponding point Cj (=Si) of the CAD data corresponding to the starting point (ending point) Si is obtained from the CAD data, and a point S'i (point reached by moving the point Cj for a distance corresponding to the difference d on the normal in the opposite direction) that corresponds substantially symmetrically to the point Pi with respect to the point Cj (=Si) on the aforesaid normal is obtained, and the NC data is modified in accordance with the point S'i. FIG. 4 shows a series of such modified points S'i. The modified NC data is composed of points obtained by correcting differences attributable to a delay in a servo system in the opposite direction on normals at the individual points of the CAD data, so that, when machining is carried out in accordance with the modified NC data, delay occurs by an amount corresponding to the differences modified by the delay in the servo system, and, as a result, a high-accuracy work shape approximate to the spline curve of the CAD data can be obtained.

As described above, according to the first embodiment of the present invention, modified NC data are created based on the CAD data, so that the volume of information becomes very large. Therefore, command data obtained from computerized numerical controllers (CNC devices) and actual machining position data are transmitted to host computers, and NC data are corrected by these host computers to obtain high-accuracy NC data.

(1) Description of Communication Network

Figure 8:
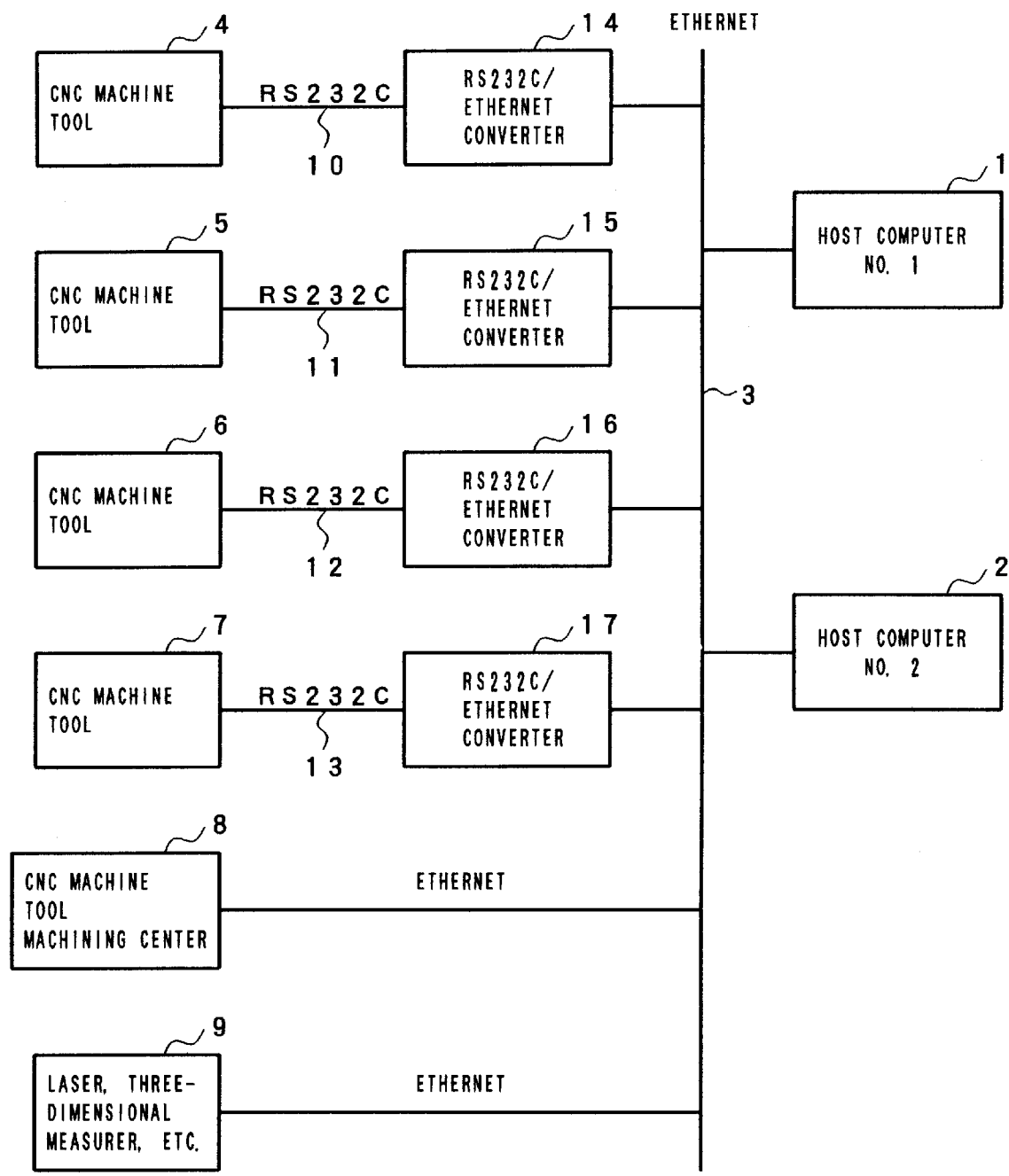
FIG. 8 is a diagram showing a communication network system to which the embodiment of the present invention is applied.

Referring now to the conceptual diagram of FIG. 8, a factory automation network system, a communication network to which the first embodiment of the present invention is applied, will be described.

A plurality of host computers, such as first and second host computers 1 and 2, are connected through an Ethernet 3 to serve as a data transmission line. Further, a plurality of CNC devices (computerized numerical controllers) 4 to 7, for machine tools and the like, are connected to the Ethernet 3 through their respective RS232C cables 10 to 13 and RS232C/Ethernet converters 14 to 17, respectively. The first and second host computers 1 and 2 are used for different purposes. For instance, the first host computer 1 is a computer for production control, while the second host computer 2 is a host computer for CAD/CAM.

The RS232C/Ethernet converters 14 to 17 serve as transceivers to function for data transmission and reception and collision detection. Further, in a CNC device 8 and a laser measurer or three-dimensional measurer 9 having their Ethernet interfaces can be connected directly to the Ethernet, so that the RS232C/Ethernet converters need not be inserted. Although many of CNC devices are provided with RS232C interfaces for compatibility with conventional data input and output devices, such as tape readers, floppy drives, etc., laser measurers and CNC devices incorporating Ethernet interfaces are also available.

The CNC devices 4 to 8 comprise a keyboard, which includes ten-keys and character keys for manual data entry, cursor moving keys, etc., and a display screen for information display. Various parts of machine tools, wire electronic discharge machine, injection molding machine, etc., as objects of control, are driven and controlled by means of CPUs (microprocessors), ROMs, RAMs, etc. incorporated into the CNC devices 4 to 8.

Display information transferred from the first and second host computers 1 and 2 includes menu selection pictures from which processing items as objects of execution are to be selected, file retrieval pictures for retrieving various items of guide information, product sketches, etc.

Some of necessary procedures for displaying these menu selection pictures, file retrieval pictures, product sketches, etc. are stored as application programs in the first and second host computers 1 and 2. As these application programs are activated at the request of the CNC devices 4 to 8, the existing menu selection picture, product sketch, etc. are transferred, and moreover, storage devices in the first and second host computers 1 and 2 are retrieved to collect necessary data to produce bar graphs and the like according to predetermined procedures and transferred to the CNC devices 4 to 8.

(2) Processings Before Data Transfer Between CNC Devices and Host Computers

Figure 9:
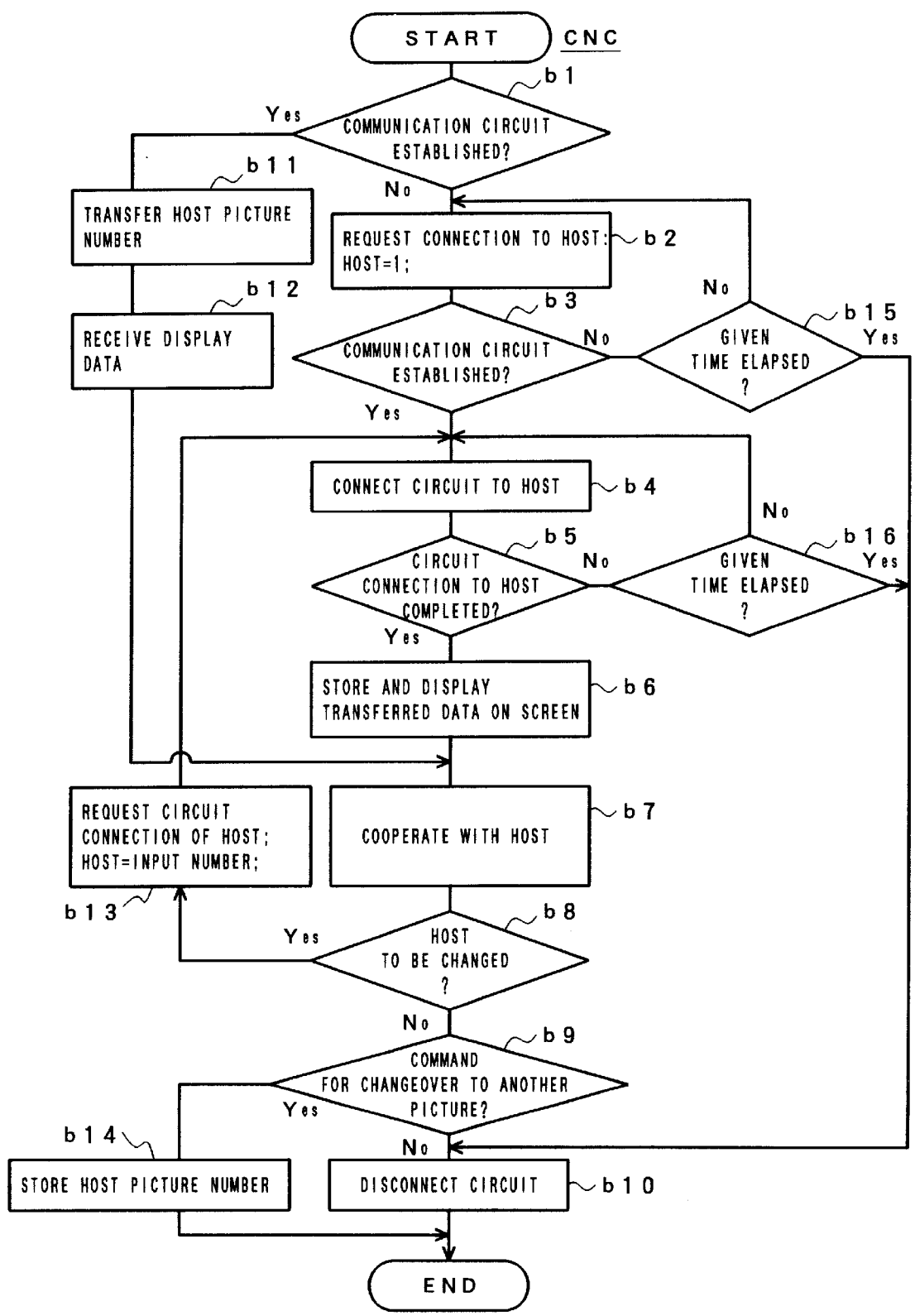
FIG. 9 is a flowchart showing an outline of an information input/output processing in a CNC device.
Figure 12:
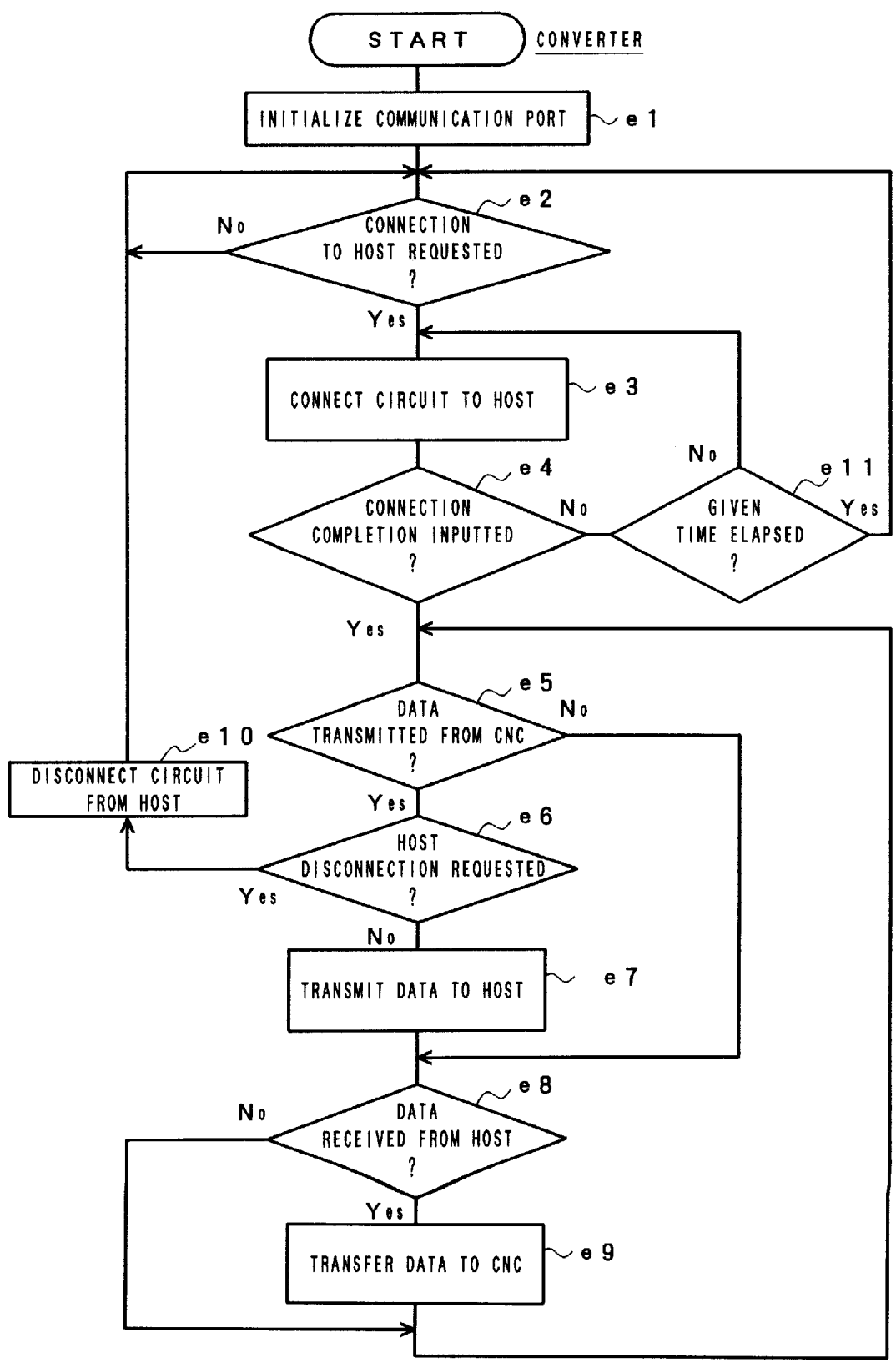
FIG. 12 is a flowchart showing an outline of a processing in an RS232C/Ethernet converter.
Figure 13:
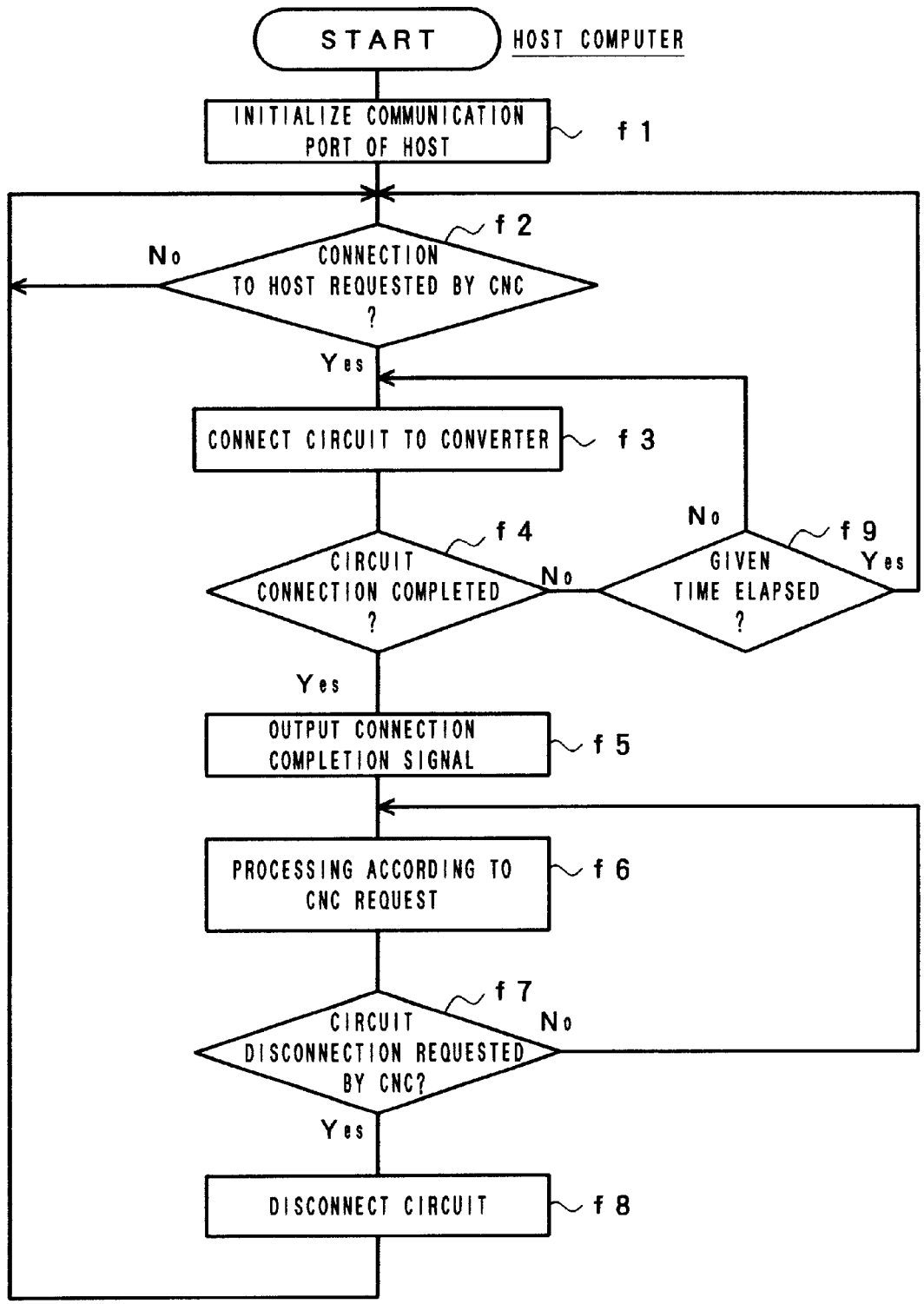
FIG. 13 is a flowchart showing an outline of an information input/output processing in a host computer.

Referring now to FIGS. 9, 12 and 13, processings carried out before data are transferred between the CNC devices and the host computers, whose circuits are connected through the RS232C/Ethernet converters, will be described.

The processing shown in the flowchart of FIG. 9 is an information input/output processing executed by the respective CPUs of the CNC devices 4 to 8, and is started when communication-only picture display commands are received from the CNC devices 4 to 8.

The processing shown in the flowchart of FIG. 12 is a processing executed steadily and continuously by CPUs dedicated to the RS232C/Ethernet converters.

The processing shown in the flowchart of FIG. 13 is an information input/output processing executed steadily and continuously by the respective CPUs of the first and second host computers 1 and 2.

In the description to follow, no reference numerals are used to designate the CNC device and RS232C/Ethernet converter to be processed, since it is unnecessary to specify the CNC device and RS232C/Ethernet converter that may be denoted by any of the reference numerals 4 to 8 and 14 to 17.

(a) Establishment of a Communication Channel Between the CNC Device and Host Computers First, the CNC device, after having started the information input/output processing in response to the operation of a communication-only picture display request key, determines whether or not a communication circuit between the CNC device and its corresponding RS232C/Ethernet converter is established (Step b1 of FIG. 9).

By this stage, the corresponding RS232C/Ethernet converter has completed the initialization of port (Step e1 of FIG. 12, processing immediately following the connection to the power supply), and is already in a standby state awaiting the input of a host connection request signal (Step e2). At this point of time, however, the host connection request signal is not delivered from the CNC device to the RS232C/Ethernet converter yet.

Thus, the communication circuit between the RS232C/Ethernet converter and the CNC device is shut off (not connected), so that the CNC device and host computers are not connected either. Hence, the result of determination in Step b1 of FIG. 9 is "No".

Thereupon, the CNC device stores the first host computer 1 as a first object of connection, and delivers the host connection request signal to the RS232C/Ethernet converter (Step b2). Then, it is determined whether or not the circuit between the CNC device and the RS232C/Ethernet converter is established (Step b3). If the circuit is not established, operation for the establishment of the circuit is repeated until the circuit is established or a given period of time has elapsed (Step b15).

The determination processing of Step b15 is an error avoiding processing for preventing the general processing operation of the CNC device from being retarded by a local hindrance such as circuit failure. Normally, the circuit between the CNC device and the RS232C/Ethernet converter is established within the range of the aforesaid given allowable time. However, if the determination in Step b15 is "Yes" for the reason such as erroneous cable connection or the like, a circuit disconnection processing is carried out immediately to complete retrial operation for circuit connection (Step b10), thereby preventing the general function of the CNC device, e.g., general drive and control function for the machine tool, from stopping.

When the circuit between the CNC device and the RS232C/Ethernet converter is established, the CNC device delivers a command for connecting the circuit with the host computer as an object of connection and an initial menu selection picture request signal to the RS232C/Ethernet converter (Step b4), and waits for the detection of the entry of a connection completion signal from the host computer as the object of connection. The retrial operation for the establishment of the circuit is repeated while waiting for the connection completion signal (Step b16). If the connection completion signal from the host computer is not inputted in a given period of time, the circuit is disconnected (Step b10) to terminate the processing.

The initial menu selection picture request signal, which is delivered from the CNC device to the RS232C/Ethernet converter for the processing of Step b4, is temporarily stored in the RS232C/Ethernet converter.

(b) Connection of the RS232C/Ethernet Converter With the Host Computer by Circuit The RS232C/Ethernet converter, after having detected a circuit connection command for the processing of Step e2 of FIG. 12, selects the first host computer 1 as the object of connection corresponding to the processing of Step b2 of FIG. 9, starts a processing for circuit connection between the RS232C/Ethernet converter and the host computer (Step e3), and repeats the operation for the establishment of the circuit (Step e11) until the connection completion signal from the host computer is inputted (Step e4). If the connection completion signal from the host computer is not inputted in a given period of time (Step e11: Yes), the circuit on the host computer side is occupied for a processing for data transfer to and from another CNC device. When this is the case, the RS232C/Ethernet converter temporarily suspends the retrial operation for the establishment of the circuit and proceeds again to the processing of Step e2, whereupon the standby state is entered to await the entry of the host connection request signal from the CNC device.

(c) Start of Connection of the Host Computer With the RS232C/Ethernet Converter

The host computer, which has already completed the initialization of the communication port by the processing of Step f1 of FIG. 13 (processing immediately following the connection to the power supply) and then has been awaiting a circuit connection request from the RS232C/Ethernet converter, detects the circuit connection request (see Step e3) from the RS232C/Ethernet converter by the processing of Step f2, starts a processing for circuit connection with the RS232C/Ethernet converter (Step f3), and repeats the operation for the establishment of the circuit (Step f9) until the connection of the circuit is made successful (Step f4). If the connection with the RS232C/Ethernet converter cannot be made in a given period of time (Step f9: Yes), the host computer suspends the retrial operation and proceeds again to the processing of Step f2, whereupon a standby state is entered in which the re-entry of the connection request signal from the RS232C/Ethernet converter is awaited.

When the circuit connection processing on the host computer side is executed successfully, the host computer delivers the connection completion signal to the RS232C/Ethernet converter (Step f5). This connection completion signal is also transmitted to the CNC device side through the RS232C/Ethernet converter, and is detected also in the processing of Step b5 on the CNC device side.

More particularly, the mutual communication channels are established when the processing in step f5 is completed for the host computer as the object of connection, when the determination in step e4 is "Yes" for the RS232C/Ethernet converter, and when the determination in step b5 is "Yes" for the CNC device, respectively.

(d) Transfer of the Initial Menu Selection Picture Request Signal to the Host Computer by the CNC Device The RS232C/Ethernet converter, after having detected the connection completion signal from the host computer in the processing of Step e4 of FIG. 12, then determines whether or not there is any data transmitted from the CNC device to the host computer (Step e5). In this case, the initial menu selection picture request signal delivered from the CNC device in the processing of Step b4 is stored in the RS232C/Ethernet converter, so that the determination in Step e5 is Yes. Then, the RS232C/Ethernet converter determines whether or not this transmitted data is a circuit disconnection request to the host computer (Step e6). Since, the initial menu selection picture request signal is not the circuit disconnection request, the determination in Step e6 is No. Thereupon, the RS232C/Ethernet converter transfers the data from the CNC device, that is, the initial menu selection picture request signal, to the host computer (Step e7).

(e) Transfer of an Initial Menu Selection Picture to the CNC Device by the Host Computer In the flowchart of FIG. 13, the host computer detects the data inputted from the CNC device through the RS232C/Ethernet converter, and Step f6 collectively shows processing executed by the host computer in response to a request made by this data. During the time interval from the instant that the processing of Step f5 is completed until the circuit disconnection request received on the CNC device side is inputted (Step f7), that is, while the circuit established between the host computer and the CNC device is not canceled yet, the host computer discriminates the request from the CNC device on receiving the data input from the CNC device, and executes the processing of the aforesaid various application programs in step f6 in response to the request. In this case, the initial menu selection picture request signal from the CNC device is inputted, so that the host computer reads a first initial menu picture from its storage device, and delivers it to the RS232C/Ethernet converter of the CNC device that has requested the data.

The first initial menu selection picture is an operation selection picture for selecting an operation to be carried out by an operator on the CNC device side using the host computer. When the operator operates the keyboard on the CNC device side to select an item number corresponding to a desired operation, with that picture displayed on the display screen on the CNC device side, the item number is displayed. Further, when an execution key is operated, the value of the set item number is transmitted to the host computer through the RS232C/Ethernet converter. As described above, according to the first embodiment, various selected or set pictures are invoked in hierarchic order through initial menu selection pictures. Therefore, in order for the operator on the CNC device side to perform any operation by means of the first and second host computers 1 and 2, the operator must first make the CNC device to display the first initial menu selection picture as a first operation. Therefore, the first host computer 1 is always set as the host computer, the object of connection, in a first access through the CNC device to be made after accomplishing the connection to the power supply, and the initial menu selection picture request signal is outputted from the CNC device together with a request for connection to the first host computer 1 (see Step b2 of FIG. 9).

(f) Data Transfer Between the CNC Device and the Host Computer

On the other hand, the RS232C/Ethernet converter having transferred the data from the CNC device to the host computer in the aforesaid processing of Step e7 of FIG. 12 and erased its temporary memory, thereafter repeatedly executes the processings of Step e8, Step e5, Step e8, . . . , and awaits data transfer from the host computer. When the RS232C/Ethernet converter detects the delivery of the data from the host computer side in the processing of Step e8, it immediately transfers these data to the CNC device (Step e9).

On the CNC device side, the data transfer from the RS232C/Ethernet converter is detected, and the data are stored and displayed on the screen, in the processing of Step b6 of FIG. 9. Thereafter, a key entry processing is carried out in response to the operator's keyboard operation or the like, and a specific cooperation with the host computer is started (Step b7). This processing in Step b7, like the aforesaid processing of Step f6 on the host computer side, is executed without interruption until the operator operates a host computer change key of the CNC device. While this is done, a handshake state is maintained between the CNC device and the host computer.

(3) Change of Host Computer

When the CNC device detects the change of the host computer in the determination processing of Step b8 of FIG. 9, it first delivers a circuit disconnection request to the host computer having so far been connected thereto through the RS232C/Ethernet converter, and delivers a circuit connection request to the next host computer to be connected with reference to the number (already inputted in the processing of Step b8) of the corresponding host computer (Step b13).

The RS232C/Ethernet converter detects the circuit disconnection request from the CNC device in the processing of Step e5 of FIG. 12, determines that this request is a request for the disconnection of the host computer (Step e6), delivers a circuit disconnection request to the host computer in the handshake state (Step e10), and returns again to Step e2, whereupon it waits until data transfer from the host computer is started, and, in response to a circuit connection request to another host computer (circuit connection request outputted in Step b13), connects the CNC device to the host computer, being an object of selection, by the same circuit connecting operation as aforesaid.

On the other hand, the host computer, having so far been connected to this CNC device, detects this circuit disconnection request in the processing of Step f7 of FIG. 13, breaks the aforesaid connection of the CNC device with the RS232C/Ethernet converter (Step f8), and returns to the initial standby state. Although the processing to be carried out by the newly connected host computer differs with respect to the display of menu pictures and the arrangement of application programs, the general flow of processing or operation is identical with that of the case of the previous host computer (host computer having so far been connected), so that a further description thereof will be omitted. The initial menu selection pictures are provided for each host computer, and the initial menu selection pictures for the host computer 2 correspond to menus including a machining schedule reference, NC data request, machining instruction reference, alarm guidance, etc.

(4) Change of Picture and Others

If a key operation for a changeover to a picture for another operation, that is, changeover to a CNC-only picture, such as a tool path drawing or machining program editing picture, not for the change of the host computer, is detected in the determination processing of Step b9 of FIG. 9, the CNC device stores the picture number for the host computer, whereupon the information input/output processing of the CNC device is once finished (Step b14), and a processing for tool path drawing or machining program editing to be executed on the CNC device side or machining control for the machine tool is started.

The picture number for the host computer is stored when selecting another picture so that the previously displayed picture of the host computer can be restored when a communication-only picture is selected again.

In the case where the host computer picture is restored from the communication-only picture, the circuit between the CNC device and the host computer has already been secured, so that the determination in Step b1 will become Yes when the communication-only picture request key is operated. Then, the CNC device transfers the picture number for the host computer (the one stored in the processing of Step b14 before the shift to the CNC-only picture) to the RS232C/Ethernet converter (Step b11), and the RS232C/Ethernet converter, upon detection of this in the determination processing of Step e5 of FIG. 12, delivers a picture transfer request to the host computer (Step e7). Thereafter, the host computer, upon detection of this request in the processing of Step f6 of FIG. 13, delivers corresponding picture data to the RS232C/Ethernet converter. Thereupon, the RS232C/Ethernet converter detects this in the processing of Step e8, and transfers this data to the CNC device (Step e9). On the other hand, having received this data, the CNC device displays the picture in the processing of Step b12, and returns to the state before the shift to the CNC-only picture.

When neither the change of the host computer nor the operation of a shift key for the changeover to another picture is required and both the determinations in Steps b8 and b9 of FIG. 9 are No, this naturally implies that the termination of the communication function is selected. Therefore, the CNC device breaks the connection between the host computer and the RS232C/Ethernet converter and the connection between the RS232C/Ethernet converter and the CNC device (Step b10), to return to its initial state, whereupon all the processing for data input and output is finished.

When the CNC device of the machine tool invokes the host computer 2, to display the initial menu picture and select the NC data request displayed in the initial menu picture by the method described above, a picture requiring the NC data is delivered from the host computer 2 to the CNC device. Thus, when an NC data number is inputted after this picture is displayed, the host computer 2 transmits NC data (machining program), corresponding to the requested NC data number, to the CNC device. After receiving and storing this NC data, the CNC device starts machining in accordance the NC data when it receives a command for the execution of the NC data.

On the other hand, between the CNC device and the host computer, processing for one-way data transmission from the CNC device to the host computer, that is, processing for transmission of data on the CNC device conditions, machine tool operation information, etc., is carried out, besides the aforesaid various processings that require reciprocal data input and output.

Of these data, the data on the CNC device conditions are detected by relatively long sampling cycle, e.g., sampling cycle of 30 seconds, and are transferred from the CNC device to the host computer. The operation information for the machine tool of the CNC device is controlled for execution or nonexecution in accordance with a sampling start command and a sampling end command written in the running machining program. The sampling is repeated by a considerably short sampling cycle, e.g., some milliseconds. Of course, these transfer data must always be collected by means of one and the same host computer, e.g., the second host computer 2 for CAD/CAM. Therefore, before the machining control by the CNC device is started, the aforesaid host computer changing operation is performed, and the CNC device is connected to the predetermined host computer, in advance. This predetermined host computer serves both as a server for data collection and a host computer for emergency message delivery.

(5) Data Transfer Process for CNC Device Conditions

Referring to the flowchart of FIG. 10, transfer processing for the data on the CNC device conditions will be described.

Figure 10:
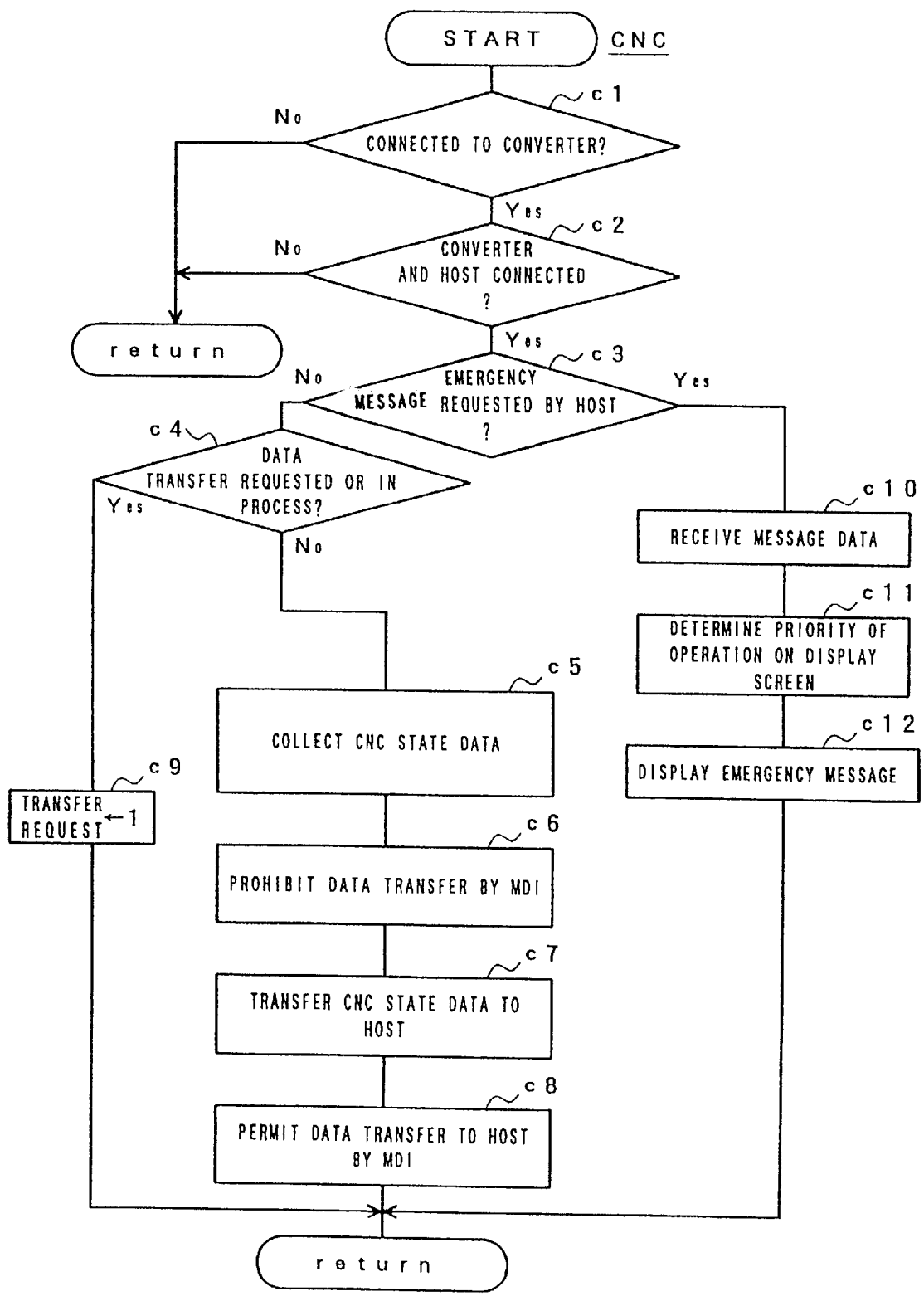
FIG. 10 is a flowchart showing an outline of an information transfer processing in the CNC device.

The processing shown in FIG. 10 is repeatedly executed by the respective CPUs of the CNC devices 4 to 8 at given cycles (e.g., 30 seconds).

The CNC device, having started the sampling and transfer processing for the data on the CNC device conditions, first determines whether or not the connection between the CNC device and the RS232C/Ethernet converter and the connection between the RS232C/Ethernet converter and the host computer are established (Steps c1 and C2). Naturally, in this case, the CNC device and the host computer should be connected to each other. If the CNC device and the host computer are not connected, this indicates that an operator has erroneously changed the host computer or intentionally broken the connection, regarding the sampling as being unnecessary. In this situation, the data transfer is impossible in either case, all the subsequent processings will be canceled.

On the other hand, when the connection is confirmed in the processes of Steps c1 and c2, the CNC device determines whether or not an emergency message from the host computer is inputted (Step c3). When no emergency message is inputted, the CNC device further determines whether or not a machining state data transfer request from the host computer is inputted, or whether or not machining state data transfer from the CNC device to the host computer is already started (Step c4). The machining state data transfer request is a command to be delivered when the host computer requests the CNC device to transfer machine tool operation data.

If neither emergency message nor machining state data transfer request is inputted, the CNC device detects data, such as the current machining mode, the number of the currently running machining program, the type of the code of a running statement, the presence or absence and type of an alarm, the input/output state of signals, the current positions of individual axes of the machine tool, etc., from its internal memory (Step c5), and sets a flag for prohibiting the operator from transferring the data by manual operation (Step c6). After state data on the CNC device collected in the processing of Step c5 are set in a buffer in accordance with a data format previously specified by the host computer and are collectively transferred to the host computer (Step c7), the CNC device resets the aforesaid flag, thereby allowing the operator to transfer the data by manual operation (Step c8). These data are stored together with a current time in a log file for each CNC device provided in the host computer.

In the case where the machining state data transfer request is detected in the determination processing of Step c4, or if machining state data transfer has already been started, the processing of Step c5 relating to the transfer of the state data on the CNC device is canceled, and the CNC device sets a transfer request flag to terminate the processing for this cycle (Step c9), and the transfer of the operation information on the machine tool is started or continued by executing a data transmission processing for the CNC machine tool operation information, which will be described later. Thus, the transfer processing for the machine tool operation information is given a higher priority to the transfer processing for the state data on the CNC device.

When the emergency message from the host computer is detected in the processing of Step c3, the CNC device reads message data (display contents) and display information (including a code for changing the display color to a special color in the case of emergency message) (Step c10), and then discriminates the operation mode of the CNC device, thereby determining whether or not the display screen of the display input unit of the device is used for an important operation (Step c11). For instance, the display screen is very likely to be used for data entry in a program editing mode, tool path drawing mode, etc., so that the priority of such picture on the display screen is concluded to be high. Naturally, in such a situation, the operator is expected to be carrying out a program editing operation, tool path behavior check, etc., attending close to the CNC device. Further, in the case where the initial picture for menu selection is simply displayed or the numerical values of data on the individual axes during automatic operation are displayed, it is very likely that the operator is not carrying out or has not started any operation or is not attending to the machine tool, leaving its operation to the CNC device, so that the priority of the displayed picture is determined to be low.

Hence, in the case where the priority of the displayed information is high, the CNC device displays a small icon for the emergency message read in Step c10 in a corner of the display screen, giving a higher priority to the currently displayed information, thereby preventing the display of the emergency message from hindering the operation by the operator. In general, in such a situation, the operator is likely to attend close to the CNC device, so that even a small-size display of the emergency message can be recognized by the operator. According to this embodiment, the icon is picked by a cursor to input a command for opening the file. By doing so, text data (or graphic data) on the emergency information can be opened and switched to the display of the content finally.

In contrast, where the priority of the displayed information is low, this indicates that the function displayed on the screen of the CNC device need not be utilized by the operator Thus, the CNC device immediately develops the text data (or graphic data) on the emergency message read in Step c10, and displays it widely on the whole display screen. In such a case, the operator is very likely to be away from the CNC device, so that in order to call the operator's attention to the emergency message, it is advisable to display the emergency message in full size (Step c12 for the above).

According to this embodiment, the state data transfer processing (Step c5) of the CNC device and the processing (Step c9) for setting the transfer request flag are made nonexecutable in the case where the emergency message from the host computer is detected in the processing of Step c3. However, when reading of the emergency message has been completed, the data transfer from the CNC device to the host computer is permitted. Therefore, it is not necessarily required to finish this processing after the execution of Step c12, and naturally, the processing of Step c4 can be entered to continue the subsequent processing after the execution of Step c12.

Figure 11:
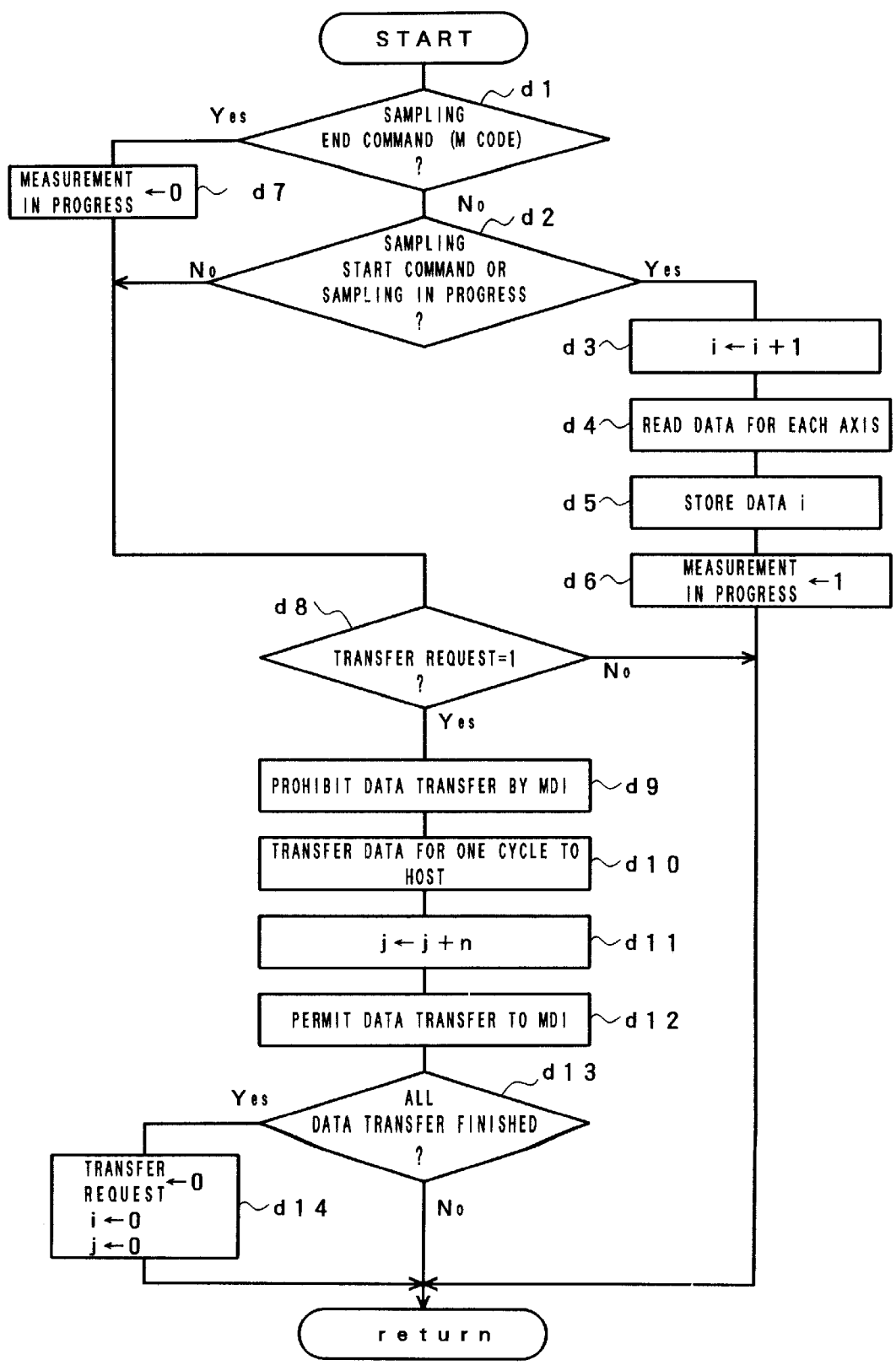
FIG. 11 is a flowchart showing an outline of another embodiment of the information transfer processing in the CNC device.

(6) Sampling of Information for Machine Tool Operation and Transfer of the Information Referring now to the flowchart of FIG. 11, a sampling process for the information on the machine tool operation and processing on the CNC device side for the transfer of the information of machine tool operation will be described. The CNC device repeatedly distributes move commands to servo circuits for the individual axes with each distribution cycle. The processing shown in FIG. 11 is carried out with each distribution cycle of the move commands.

First, in acquiring data for correcting the NC data when a high-accuracy work shape must be obtained, an M code of the sampling start command is added to the machining program, at a start position of a block of a section that requires the high-accuracy work shape, and, moreover, an M code of the sampling end command is previously programmed at a position of the block subsequent to the section terminated.

Then, it is determined whether or not a statement being currently read from the running machining program is the M code of the sampling end command (Step d1). If the sampling end command is not identified, it is further determined whether or not this statement is the M code of the sampling start command, or whether or not a measurement state storage flag is set (Step d2).

Further, the initial value of the measurement state storage flag is set to "0" that indicates that no measurement is being made, and the values of an index i, which indicates the total sampling number, and an index j, which indicates the transferred sampling number, are initially set to 0 respectively.

If both the determinations in Steps d1 and d2 are "No", the currently read statement is neither the M code of the sampling end command nor the M code of the sampling start command, and the measurement state storage flag is not set, the CNC device then determines whether or not the machining state data transfer request flag (see FIG. 10) is set (Step d8). When the transfer request flag is not set, the CNC device immediately finishes the operation information transfer processing for the cycle.

Thus, the CNC device repeatedly executes only the determination processings of Steps d1, d2 and d8 in the operation information transfer processing for each cycle during a period before the M code of the first sampling start command is read from the machining program. If the machining state data transfer request from the host computer is received during this period, the processing of Step d9 and the subsequent processings are carried out. In this case, however, the transferred operation information is null data. It is determined whether or not the value of the index i is greater than 0 when the machining state data transfer request is detected. In this case, the processing of Step d9 and the subsequent processings may be carried out only when the index value is greater than 0.

When the M code of the sampling start command is read from the machining program while only the determination processings of Steps d1, d2 and d8 are repeatedly executed in the above-described manner, the CNC device increases the value of the index i, representing the total sampling number, by 1 (Step d3), and reads a value (actual position) P in a current position register for each axis calculated according to a feedback signal from the machine tool, a value s to be obtained before adding a current-cycle command value in a current command position register for adding the command values distributed among individual axes and storing a command position, and a current load value t (value estimated by a real current or observer) for each feed axis (Step d4). Further, the CNC device writes these data in a storage region of an operation information storage file (see FIG. 5) corresponding to the value of the index i (Step d5), and sets the measurement state storage flag (Step d6).

When the measurement state storage flag is set, only the processings of Steps d1 to d6 are repeatedly executed in the subsequent processing cycles, and the aforesaid operation information for each sampling cycle is written sequentially in the storage region of the operation information storage file. During these processings, the set state of the machining state data transfer request flag is not confirmed, so that, even if the machining state data transfer request is inputted from the host computer side, no processings for the transfer of the operation information are carried out at all. Since the machining state data transfer request flag is set in the aforesaid state data transfer processing (FIG. 10), the flag setting itself is possible, and the processing for the transfer of the operation information can be started after completing the sampling process. Since the M code of the sampling start command and the M code of the sampling end command can be written as statements in any positions in the machining program, the sampling section can be set freely on the machining path on the basis of one machining block, as a minimum unit, for arcuate or straight interpolation.

When the M code of the sampling end command is read from the machining program while the sampling processing is repeated in this manner, the CNC device resets the measurement state storage flag (Step d7), and determines whether or not the machining state data transfer request from the host computer is already inputted during the sampling processing (Step d8). Naturally, the sampling data need not be transferred if the machining state data transfer request is not detected, and the CNC device finishes the operation information transfer processing for this cycle while keeping the sampled data in the operation information storage file. Therefore, in the case where the M code of the sampling start command is read anew from the machining program in such a situation, data for the next sampling section are written in succession in the same manner as aforesaid, starting from the next storage region to the current value of the index i.

When the machining state data transfer request from the host computer is finally detected, the CNC device sets a flag for prohibiting the operator from transferring the data by manual operation (Step d9), sets a first n sets of data, stored in the operation information storage file, in the buffer in accordance with the data format previously specified by the host computer and transfers them to the host computer (Step d10), and increases the value of the index j by n to update the value of the transferred data number j (Step d11). Thereafter, the CNC device resets the aforesaid flag, thereby allowing the operator to transfer the data by manual operation (Step dl2).

Subsequently, the CNC device determines whether or not all the data in the operation information storage file are transferred to the host computer (whether $j \geq i$ or not) (Step d13). If the transfer of all the data is completed, the CNC device resets the machining state data transfer request and the values of the indexes i and j, respectively to clear the contents of the operation information storage file (Step d14), whereupon the operation information transfer processing for this cycle is finished.

However, depending on the capacity of the transmission line, the number of transmittable data is limited (e.g., n pieces), and, since some sampling sections on the machining program are considerably long, it cannot always be ensured that all the data can be transferred by one cycle of transfer operation.

Therefore, if all the data cannot be transferred in the processing in Step d10, that is, if the determination in Step d13 is No, the CNC device holds the whole of the block transfer request, the respective values of the indexes i and j, and the contents of the operation information storage file as they are, and transfers the remaining data in the processings for the next and subsequent cycles.

Thereafter, during a period before all the data in the operation information storage file are transferred to the host computer so that $j \geq i$ is obtained, the CNC device repeatedly executes the processings of Steps d9 to d12 in the same manner as aforesaid, and transfers n sets of operation information to the host computer with every processing cycle. Then, when the transfer of all the data is finally completed, the CNC device resets the machining state data transfer request and the indexes i and j, thereby clearing the contents of the information storage file, in the processing of Step d14. However, this applies only to the case where there is only one operation information storage file. Thus, if the sampling data are made to be written in another operation information storage file of the same configuration while the data in the one operation information storage file are being transferred, the M code of a new sampling start command can be read without problem even during the operation for the transfer of the data from the operation information storage file.

In this manner, as shown in FIG. 5, a table T1 in the second host computer 2 is stored with the current command position si(Xsi, Ysi, Zsi) (value in the current command position register before the command value for the distribution cycle concerned is added thereto), actual machine position Pi(Xpi, Ypi, Zpi) (value in the current position register), and current load value ti(Xti, Yti, Zti) (value estimated by the real current or observer). Since the current command position data si represents the position for each distribution cycle of the move commands, it always includes the starting point (ending point) Si of one block of the NC data.

(7) NC Data Modification Process

Figure 7:
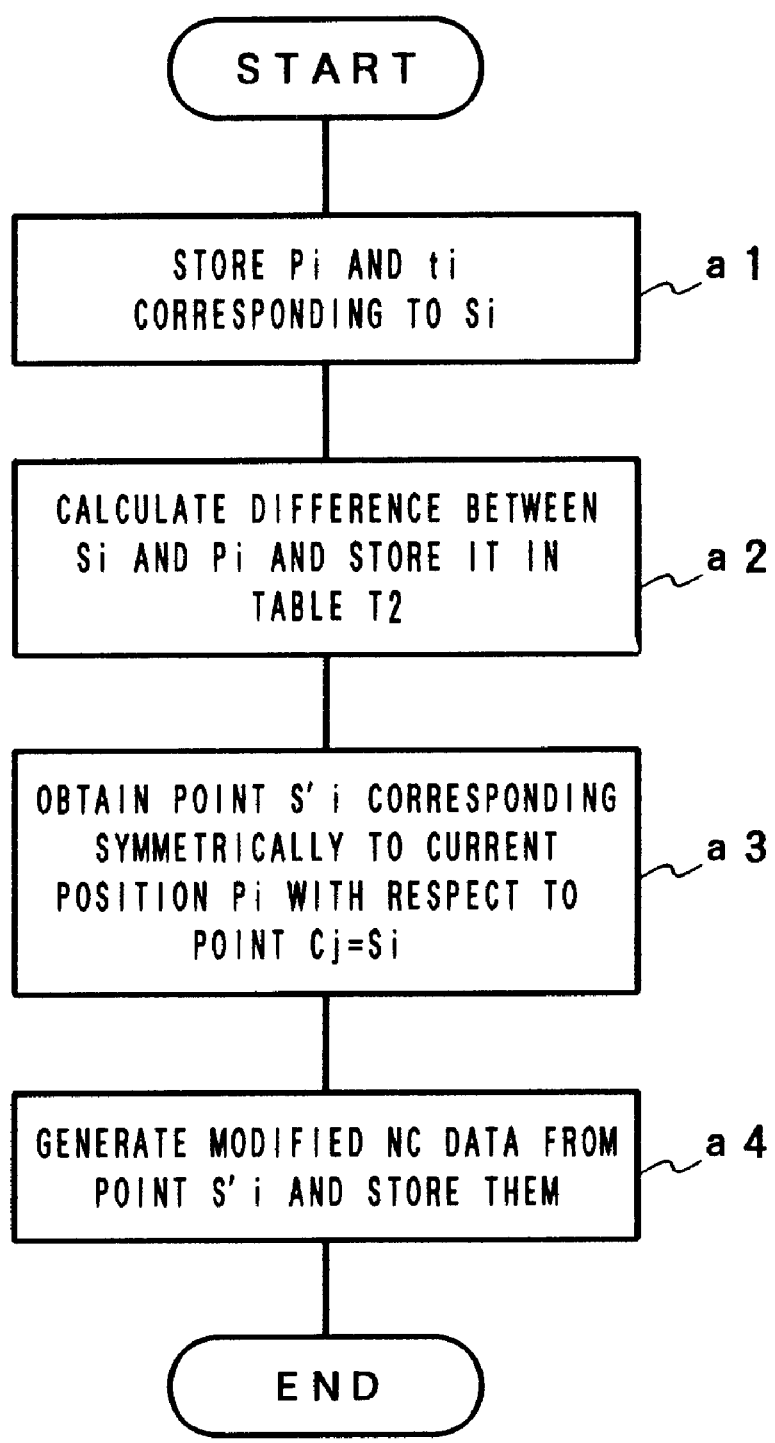
FIG. 7 is a processing flowchart for obtaining the modified NC data according to a first embodiment of the present invention.

Referring now to FIG. 7, an NC data modification processing to be carried out by the second host computer based on the collected data (FIG. 5) will be described.

When an NC data modification command is inputted to the second host computer 2, the host computer 2 starts the processing shown in FIG. 7, and obtains the current command position s (command position for each distribution cycle) corresponding to each point Cj of the CAD data corresponding to the NC data. As described previously, the starting and ending points Si of one block of the NC data are set at one of the points Cj of the CAD data, so that they can be recognized by the current command position s specified with every distribution cycle.

The actual position Pi corresponding to the detected starting point (ending point) Si of one block and the then value of the load data ti are stored corresponding to Cj of the CAD data, as in a table T2 shown in FIG. 6 (Step a1). In the example described in FIG. 6, CAD data C1 corresponds to a starting point (ending point) S1 of one block, C2 to S2, C4 to S3, C5 to S4, C6 to C5, C7 to S6, C9 to S7, C12 to S8, and Cj to Si respectively.

Then, a difference di is obtained by subtracting the corresponding actual position Pi from the starting point (ending point) Si of one block as follows:

$$di=[(Xsi-Xpi)^2+(Ysi-Ypi)^2+(Zsi-Zpi)^2]^{1/2},$$

and is stored in the table T2 (Step a2).

The normal at the point Si on the spline line of the CAD data is obtained from the CAD data, and the point S'i that corresponds substantially symmetrically to the actual point Pi with respect to the point Si on this normal is obtained. More specifically, the point S'i(Xc'i, Yc'i, Zc'i) to be reached by moving the point Si for a distance corresponding to the difference di on the normal in the opposite direction is obtained (Step a3) (see FIG. 4). This point S'i is corrected data, and modified NC data is generated on the basis of the corrected data S'i and stored (Step a4).

The corrected NC data is obtained considering a position difference attributable to a delay in the servo system as a data correction value, so that, when machining is carried out after delivering this modified NC data to the CNC device of the machine tool by the aforementioned communication method, this correction value and the actual delay in the servo system cancel each other to approximate the actual work shape to the shape given by the CAD data, whereby a high-accuracy work shape having only minor errors can be obtained.

Further, the aforesaid correction may be made further in consideration of an absolute value t'i of the aforementioned load ti(Xti, Yti, Zti) of the feed axis, given as $$t'i = (Xti^2 + Yti^2 + Zti^2)^{1/2}$$

In this case, the weight Qi for each point Si of the start point (end point) is obtained from the absolute value t'i of the load, and the Qi is multiplied by the difference di to obtain a difference d'i for correction, so that the point S'i corrected in step S3 is determined.

For example, a mean value is obtained by adding up the absolute values t'i of the load for all sections (i=1~n), and dividing the sum by a sampling number n; the weight Qi is obtained by dividing the absolute value t'i of the load for each point by this mean value; and the difference d'i for correction is obtained by multiplying the weight Qi by the difference di.

$$Qi = t'i/\{(t'1+t'2+t'3+\ldots+t'n)/n\},$$

$$d'i = di \cdot Qi.$$

Instead of obtaining the weight Qi by dividing the absolute value t'i of the load value for each point by the mean load value, the weight Qi may be obtained by dividing the absolute value t'i of the load value for each point by a set predetermined value a (e.g., value about 0.5 to 2 times as large as the mean load value).

Alternatively, the aforesaid weight may be obtained based on the load data on the main axis, not based on the load value on each axis. In this case, the main axis load data should only be used in place of the absolute value t'i of the load ti.

Further, according to the embodiment described above, the modified CNC data is obtained by determining the data correction value corresponding to the level of the load. However, instead of obtaining this data correction value, the machining speed may be changed depending on the level of the load. In this case, a mean value of the absolute values t'i of the load ti may be obtained so that the NC data can be modified by changing the machining speed (i.e., by lowering the machining speed when the mean value is large) in accordance with the level of the mean value. Alternatively, the modified NC data may be generated by displaying the absolute values t'i of the load ti on a display device or the like and inputting an override command or other speed change command for lowering machining speed in high-load blocks and increasing machining speed in low-load blocks.

According to the first embodiment described above, the NC data is created from the CAD data, and the created NC data is modified for high-accuracy machining with use of the CAD data.

Although the NC data is created from the CAD data, it can be modified for high-accuracy machining without using the CAD data. Even though the NC data is created from the CAD data, it naturally can be modified for high-accuracy machining without using the CAD data. Accordingly, one such case in which the NC data is modified without using the CAD data will now be described as a second embodiment.

B. Description of Second Embodiment

The table T1 of FIG. 5 is prepared by obtaining the current command position si(Xsi, Ysi, Zsi) (value in the current command position register before the command value for the distribution cycle concerned is added thereto), actual machine position Pi(Xpi, Ypi, Zpi) (value in the current position register), and current load value ti(Xti, Yti, Zti) (value estimated by the real current or observer), in the same manner as in the foregoing first embodiment. Then, a current command position s(Xs, Ys, Zs) corresponding to the starting point (ending point) Si of each block is obtained from the table T1, and the actual position Pi(Xpi, Ypi, Zpi) (value in the current position register) corresponding to the corresponding current command position s=Si(Xsi, Ysi, Zsi) and the current load value ti(Xti, Yti, Zti) are obtained to prepare a table similar to the table T2 of FIG. 6 (corresponding to Step a1). In this case, the CAD data is not used.

Then, a difference di(Xdi, Ydi, Zdi) corresponding to the starting point (ending point) Si(Xsi, Ysi, Zsi) of each block is obtained (corresponding to Step a2). Then, the corrected point S'i(Xs'i, Ys'i, Zs'i) is obtained by adding the difference for each axis (corresponding to Step a3). More specifically, the corrected point S'i is obtained by adding the difference for each axis, that is, by making computation as follows:

$$Xs'i = Xsi + Xdi,$$

$$Ys'i = Ysi + Ydi,$$

$$Zs'i = Zsi + Zdi.$$

If the differences Xdi, Ydi and Zdi for the individual axes are positive, the corrected values Xs'i, Ys'i and Zs'i for the individual axes are greater than the values Xsi, Ysi and Zsi for the individual axes at the starting point (ending point) Si of each block, respectively; if the differences are negative, in contrast with this, the former values are smaller.

In consequence, as shown in FIG. 4, the corrected point S'i corresponds substantially symmetrically to the actual point Pi with respect to the starting point (ending point) Si of each block. If the modified NC data is created on the basis of this corrected point S'i (corresponding to Step a4), the command position of the NC data is already corrected by an amount corresponding to a follow-up delay in the servo system in positions where machining errors occur by the delay, as in the case of the first embodiment, and thus, high-accuracy machining with minor machining errors can be carried out in a manner such that the delay in the servo system is canceled to bring the tool path close to the NC data block.

In this case too, if the aforesaid correction is expected to be made in consideration of the load ti(Xti, Yti, Zti), weights Xqi, Yqi and Zqi for the individual axes corresponding to the differences Xdi, Ydi ad Zdi for the individual axes are obtained for each point Si from the load values Xti, Yti and Zti for the individual axes, and the difference di(Xdi, Ydi, Zdi) is multiplied by these weights to determine differences for correction and obtain corrected points C'i.

In connection with the X-axis, for example, a mean value is obtained by adding up the loads Xti on the X-axis for all sections (i=1~n) and dividing the sum by the sampling number n, and the weight Xqi is obtained by dividing the load value for each point by the mean value as follows:

$$Xqi = Xti/\{(Xt1+Xt2+\ldots+Xtn)/n\}.$$

Likewise, the weight Yqi of each point on the Y-axis and the weight Zqi of each point on the Z-axis are given as follow:

$$Yqi = Yti/\{(Yt1+Yt2+\ldots+Ytn)/n\},$$

$$Zqi = Zti/\{(Zt1+Zt2+\ldots+Ztn)n\}.$$

The corrected points S'i(Xs'i, Ys'i, Zs'i) are given by $$Xs'i = Xsi + Xqi \cdot Xdi,$$

$$Ys'i = Ysi + Yqi \cdot Ydi,$$

$$Zs'i = Zsi + Zqi \cdot Zdi.$$

In this case too, instead of obtaining the weights $Xqi$, $Yqi$ and $Zqi$ by dividing the load values $Xti$, $Yti$ and $Zti$ for the individual points by the mean value of the load of each axis, the weights $Xqi$, $Yqi$ and $Zqi$ may be obtained by dividing the load values $Xti$, $Yti$ and $Zti$ for the individual points by the set predetermined value $\alpha$ (e.g., value about 0.5 to 2 times as large as the mean load value).

According to the first and second embodiments, the memory capacity of the CNC device is too small to store the CAD data and the like, so that the sampling data of the operation information are transmitted to the host computer to use the host computer to create the corrected NC data. If the memory capacity of the CNC device is made large enough, however, the corrected NC data may be created by executing the aforesaid processing shown in FIG. 7 by means of a processor of the CNC device without transmitting the sampling data for the operation information to the host computer. According to the second embodiment, in particular, the CAD data is not used for the NC data modification, so that the aforesaid NC data modification processing may be carried out by means of the CNC device itself without using the host computer.

Further, according to the first and second embodiments described herein, the current command position, actual position and load value for each distribution cycle are obtained, and the position of the starting point (ending point) of each block of the NC data is obtained from among the current command positions. Alternatively, however, the actual position and load value, as well as the value in the current command value register before the addition of distributed move commands (current command value), may be read and stored for only during the next distribution cycle after all the move commands for one block are outputted. In this case, the actual position and load value for the starting point (ending point) of each block of the NC data are directly obtained, so that volume of data to be processed can be reduced.

What is claimed is:

1. A CNC data correction method comprising steps of:
    (a) carrying out machining by a CNC machine tool in accordance with created NC machining data to obtain actual machining position data corresponding to a command position for the starting or ending point of each block of the NC data, and the difference between an actual machining position and the command position for the starting or ending point of each block of the NC data;
    (b) obtaining a data correction value based on the difference; and
    (c) setting a point obtained by advancing the command position for the starting or ending point in the commanded NC machining data oppositely from the actual machining position by a distance corresponding to the data correction value obtained in said step (b) on a straight line connecting the command position for the starting or ending point of the block of the NC data and the actual machining position corresponding thereto, as a modified command position for the starting or ending point of the block of the NC data.

2. A CNC data correction method according to claim 1, wherein the difference is used as the data correction value in said step (b).

3. A CNC data correction method according to claim 1, wherein the block of the created NC machining data is composed of a series of infinitesimal straight lines constituting a curve created by utilizing a CAD, and the straight line connecting the command position for the starting or ending point of each block of the NC data of said step (a) and the actual machining position corresponding thereto is a line normal to the curve at the starting or ending point.

4. A CNC data correction method according to claim 1, wherein current positions of a move command and the actual machining position are determined individually for each distribution cycle of the move command while the machining is carried out by the CNC machine tool, one of the current positions of the move command, obtained for each distribution cycle, is selected as the command position for the starting or ending point of the block of the NC data in said step (a), and the actual machining position corresponding to the selected current position of the move command is used as the actual machining position data for the starting or ending point of the block.

5. A CNC data correction method according to claim 1, wherein said step (a) further includes determining a load acting on a feed axis or main axis at the starting or ending point of each block of the NC data, and said step (b) includes determining a data correction value in accordance with the difference obtained in said step (a) and the determined load.

6. A CNC data correction method according to claim 5, wherein a machining speed of the created NC machining data is changed in accordance with the value of the determined load.

7. A CNC data correction method according to claim 1, wherein said command position for the starting or ending point of the block of the NC data of said step (a) and the actual machining position corresponding thereto are defined by a set of position data for each feed axis, and wherein the difference between the command position and the actual machining position of said step (a) is also defined by a set of data for each feed axis, so that the data correction value of said step (b) is also composed of data for each feed axis.

8. A CNC data correction method according to claim 1, wherein the actual machining position data corresponding to the command position for the starting or ending point of each block of the NC data obtained in said step (a) is transmitted to a computer through a communication circuit, and said steps (b) and (c) are executed after the difference between the command position for the starting or ending point of each block of the NC machining data and the actual machining position is calculated by the computer.

9. A CNC data correction system comprising:
    a CNC machine tool; and
    a computer with a CAD/CAM function connected to said CNC machine tool by a communication circuit,
    said CNC machine tool including:
        sampling means for sampling running machining information for each predetermined cycle in accordance with NC data; and
        data transfer means for transferring the machining information obtained by said sampling means to said computer through said communication circuit in response to a command,
    said computer including:
        storage means for correspondingly storing a command position in the NC data corresponding to each point in CAD data corresponding to the starting or ending point of each block of the NC data and the machining information corresponding to the point;
        correction value calculating means for calculating a correction value for the NC data for each point based on the command position for each point stored in said storage means and the machining information;
        normal calculating means for calculating a normal at the point in said CAD data;

correction data originating means for determining a modified command position for the starting or ending point of each block of the NC data by using the normal and the correction value which are obtained for each point in said CAD data corresponding to the starting or ending point of each block of the NC data by using said normal calculating means and said correction value calculating means; and modified data transfer means for transferring the NC data modified by said correction data creating means to the CNC machine tool side through said communication circuit in response to a command.

10. A CNC data modification method, comprising;

obtaining actual machining position data corresponding to a command position for a tool;

obtaining the difference between an actual machining position and the command position;

obtaining a data correction value based on the difference;

calculating a normal corresponding to the data correction value; and modifying the command position data of next machining by using the normal and the data correction value.

* * * * *

UNITED STATES PATENT AND TRADEMARK OFFICE
CERTIFICATE OF CORRECTION

PATENT NO. : 6,167,325
DATED : December 26, 2000
INVENTOR(S) : Kamiguchi et al.

It is certified that error appears in the above-identified patent and that said Letters Patent is hereby corrected as shown below:

Column 5,
Line 17, change "Communication Channel Between" to -- communication channel between -- and
Line 18, change "Device and Host Computers" to -- device and host computers: --.

Column 6,
Line 10, change "Converter With" to -- converter with --;
Line 11, change "Host Computer by Circuit" to -- host computer by circuit: --;
Line 30, change "Connection of the Host Computer With" to -- connection of the host computer with --;
Line 31, change ""Converter" to -- converter: --;
Line 62, change "Initial Menu Selection Picture Request" to -- initial menu selection picture request --; and
Line 63, change "Signal to the Host Computer by the CNC Device" to -- signal to the host computer by the CNC device: --.

Column 7,
Line 13, change "Initial Menu Selection Picture" to -- initial menu selection picture --;
Line 14, change "Device by the Host Computer" to -- device by the host computer --;
Line 56, change "Transfer Between the CNC Device and the Host" to -- transfer between the CNC device and the host --; and
Line 57, change "Computer" to -- computer: --.

Signed and Sealed this

Tenth Day of August, 2004

JON W. DUDAS
*Acting Director of the United States Patent and Trademark Office*